US009294013B2

(12) United States Patent
Allaei

(10) Patent No.: US 9,294,013 B2
(45) Date of Patent: Mar. 22, 2016

(54) BUILDINGS WITH WIND-ENERGY-CONVERSION SYSTEMS

(75) Inventor: Daryoush Allaei, Minnetonka, MN (US)

(73) Assignee: SHEER WIND, INC., Chaska, MN (US)

( * ) Notice: Subject to any disclaimer, the term of this patent is extended or adjusted under 35 U.S.C. 154(b) by 403 days.

(21) Appl. No.: 13/605,310

(22) Filed: Sep. 6, 2012

(65) Prior Publication Data
US 2014/0062093 A1 Mar. 6, 2014

(51) Int. Cl.
F03D 9/00 (2006.01)
H02N 2/18 (2006.01)
F03D 1/04 (2006.01)
F03D 3/04 (2006.01)

(52) U.S. Cl.
CPC .............. *H02N 2/185* (2013.01); *F03D 1/04* (2013.01); *F03D 3/0427* (2013.01); F05B 2240/9112 (2013.01); Y02B 10/30 (2013.01); Y02E 10/728 (2013.01); Y02E 10/74 (2013.01); Y10T 29/49826 (2015.01)

(58) Field of Classification Search
CPC .............. F01D 1/04; F01D 3/04; F03D 9/00; F03D 11/00
USPC .......................... 290/44, 55; 415/4.2, 4.1, 2.1
See application file for complete search history.

(56) References Cited

U.S. PATENT DOCUMENTS

| | | |
|---|---|---|
| 84,237 A | 11/1868 | Waite |
| 299,127 A | 5/1884 | Garrigus |
| 330,265 A | 11/1885 | Scovill |
| 1,345,022 A | 6/1920 | Oliver |
| 1,496,767 A | 6/1924 | Bonetto |
| 2,616,506 A | 11/1952 | Mathias |
| 3,894,393 A | 7/1975 | Carlson |
| 4,406,579 A | 9/1983 | Gilson |
| 4,421,452 A | 12/1983 | Rougemont |
| 4,452,046 A | 6/1984 | Valentin |
| 4,508,973 A | 4/1985 | Payne |
| 4,536,674 A | 8/1985 | Schmidt |
| 5,394,016 A | 2/1995 | Hickey |
| 5,621,264 A | 4/1997 | Epstein et al. |
| 6,097,104 A | 8/2000 | Russell |
| 6,201,313 B1 * | 3/2001 | Nakamats ........................ 290/54 |

(Continued)

FOREIGN PATENT DOCUMENTS

CN 101575082 A 11/2009
EP 1961956 A1 8/2008

(Continued)

OTHER PUBLICATIONS

D. Allaei, "Intake Assemblies for Wind-Energy Conversion Systems and Methods"; U.S. Appl. No. 13/307,313, filed Nov. 30, 2011; Total pp. 61.

(Continued)

*Primary Examiner* — Julio Gonzalez
(74) *Attorney, Agent, or Firm* — Billion & Armitage; Benjamin C. Armitage

(57) ABSTRACT

An embodiment of a building may include a wind-energy-conversion system with a duct that may be a substantially vertical converging nozzle. An energy extractor may be fluidly coupled to the duct. For some embodiments, a space within the building may be part of the wind-energy-conversion system and may be fluidly coupled to the energy extractor by the duct.

13 Claims, 14 Drawing Sheets

(56) References Cited

U.S. PATENT DOCUMENTS

| | | | |
|---|---|---|---|
| 6,765,309 B2 * | 7/2004 | Tallal et al. | 290/55 |
| 7,358,623 B2 | 4/2008 | Richards et al. | |
| 7,495,350 B2 | 2/2009 | Pinkerton et al. | |
| 7,573,143 B2 | 8/2009 | Frayne | |
| 7,811,048 B2 | 10/2010 | Allaei | |
| 7,821,153 B2 | 10/2010 | Gray | |
| 7,872,366 B2 | 1/2011 | Gray | |
| 7,875,992 B2 | 1/2011 | Gray | |
| 7,948,109 B2 | 5/2011 | Gray | |
| 8,120,193 B2 | 2/2012 | Nightingale | |
| 8,134,252 B2 | 3/2012 | Pagliasotti | |
| 8,188,614 B2 | 5/2012 | Pagliasotti | |
| 8,525,390 B2 | 9/2013 | Allaei | |
| 2008/0074002 A1 | 3/2008 | Priya et al. | |
| 2008/0129254 A1 * | 6/2008 | Frayne | 322/3 |
| 2008/0297119 A1 | 12/2008 | Frayne | |
| 2009/0087301 A1 | 4/2009 | Krouse | |
| 2009/0256360 A1 | 10/2009 | Candelas Perez et al. | |
| 2009/0295163 A1 | 12/2009 | Frayne | |
| 2009/0309362 A1 | 12/2009 | Frayne | |
| 2010/0052324 A1 | 3/2010 | Priya | |
| 2010/0084867 A1 | 4/2010 | Sato | |
| 2010/0133847 A1 * | 6/2010 | Allaei | 290/55 |
| 2010/0133954 A1 | 6/2010 | Despesse et al. | |
| 2010/0244453 A1 | 9/2010 | Dornan | |
| 2010/0278629 A1 | 11/2010 | Krippene | |
| 2010/0308592 A1 | 12/2010 | Frayne | |
| 2011/0048008 A1 | 3/2011 | Obadan | |
| 2011/0135443 A1 * | 6/2011 | Cucci et al. | 415/1 |
| 2011/0181049 A1 * | 7/2011 | Ho et al. | 290/1 R |
| 2011/0316279 A1 | 12/2011 | Bahari et al. | |
| 2012/0056482 A1 | 3/2012 | Kaufman | |
| 2012/0086310 A1 | 4/2012 | Allaei | |

FOREIGN PATENT DOCUMENTS

| | | |
|---|---|---|
| EP | 2108820 A2 | 10/2009 |
| FR | 2 922 607 A1 | 4/2009 |
| JP | 2001-231273 A | 8/2001 |
| JP | 2002-262584 A | 9/2002 |
| JP | 2007-016756 A | 1/2007 |
| JP | 2007-198175 A | 8/2007 |
| JP | 2009-243393 A | 10/2009 |
| JP | 2012-107612 | 6/2012 |
| KR | 10-2008-0013569 A | 2/2008 |
| NZ | 577700 A | 12/2011 |
| WO | 2008039089 A1 | 4/2008 |
| WO | WO 2009/058759 A2 | 5/2009 |
| WO | 2012003683 A1 | 1/2012 |
| WO | 2012023745 A2 | 2/2012 |
| WO | 2013082369 A1 | 6/2013 |

OTHER PUBLICATIONS www.autobloggreen.com/photos/rormaxx/1263571, "RORMaxx Automotive", Jan. 6, 2009, pp. 2.

S. Priya, et al. "Piesoelectric Windmill: A Novel Solution to Remote Sensing", Japanese Journal of Applied Physics, vol. 44, No. 3, 2005, pp. L104-L107.

S. J. Oh, et al. "Development of a Tree-Shaped Wind Power System Using Piezo-Electric Materials", Journal of the Korean Solar Energy Society, vol. 28, No. 3, 2008, ISSN 1598-6411, pp. 53-59.

S. Li, et al. "Vertical-Stalk Flapping-Leaf Generator for Wind Energy Harvesting", Proceedings of ASME 2009 Conference on Smart Materials, adaptive Structures and Intelligent Systems, SMASIS 2009, Sep. 20-24, 2009, pp. 1-9.

Dickson, "Wind Tree", http://peswiki.com/index.php/directory:Rick_Dickson:Wind_Tree, Sep. 26, 2007, pp. 1-8.

Li, et al., "Flapping Piezo-Leaf Generator for Wind Energy Harvesting", Cornell Computational Synthesis Laboratory, http://ccsl.mae.cornell.deu/node/116, pp. 1-2.

1$^{st}$ Examination Report for corresponding New Zealand application No. 631607 mailed on Jun. 22, 2015.

Extended European Search Report for corresponding European Application No. 13834842.0, dated Dec. 17, 2105, 8 pages.

* cited by examiner

BUILDINGS WITH WIND-ENERGY-CONVERSION SYSTEMS

FIELD

The present disclosure relates generally to wind-energy conversion, and, in particular, the present disclosure relates to buildings with wind-energy-conversion systems.

BACKGROUND

Energy shortages, high energy costs, and other energy problems have increased interest in small-scale (e.g., household-scale or building-scale) renewable energy technologies to help offset energy costs. For example, small-scale solar power generation systems have been integrated into energy-consuming buildings.

Wind energy is another renewable energy source that is becoming more popular. For example, some wind-energy-conversion systems involve the wind causing a turbine, located atop a tower, to rotate an electrical generator, resulting in the generation of electrical power. However, such wind-energy-conversion systems might be unattractive for small-scale applications, in that they are large and aesthetically unpleasing and can have low efficiency, high capital costs, high maintenance costs, and/or unacceptably high noise and vibration.

For the reasons stated above, and for other reasons stated below which will become apparent to those skilled in the art upon reading and understanding the present specification, there is a need in the art for buildings with wind-energy-conversion systems.

SUMMARY

An embodiment of a building may include a wind-energy-conversion system with a duct that may be a substantially vertical converging nozzle. An energy extractor may be fluidly coupled to the duct. For some embodiments, a space, e.g., a story, within the building may be part of the wind-energy-conversion system and may be fluidly coupled to the energy extractor by the duct. The wind-energy-conversion system might be installed as part of constructing the building or installed after the building is constructed.

DETAILED DESCRIPTION

Figure 1:
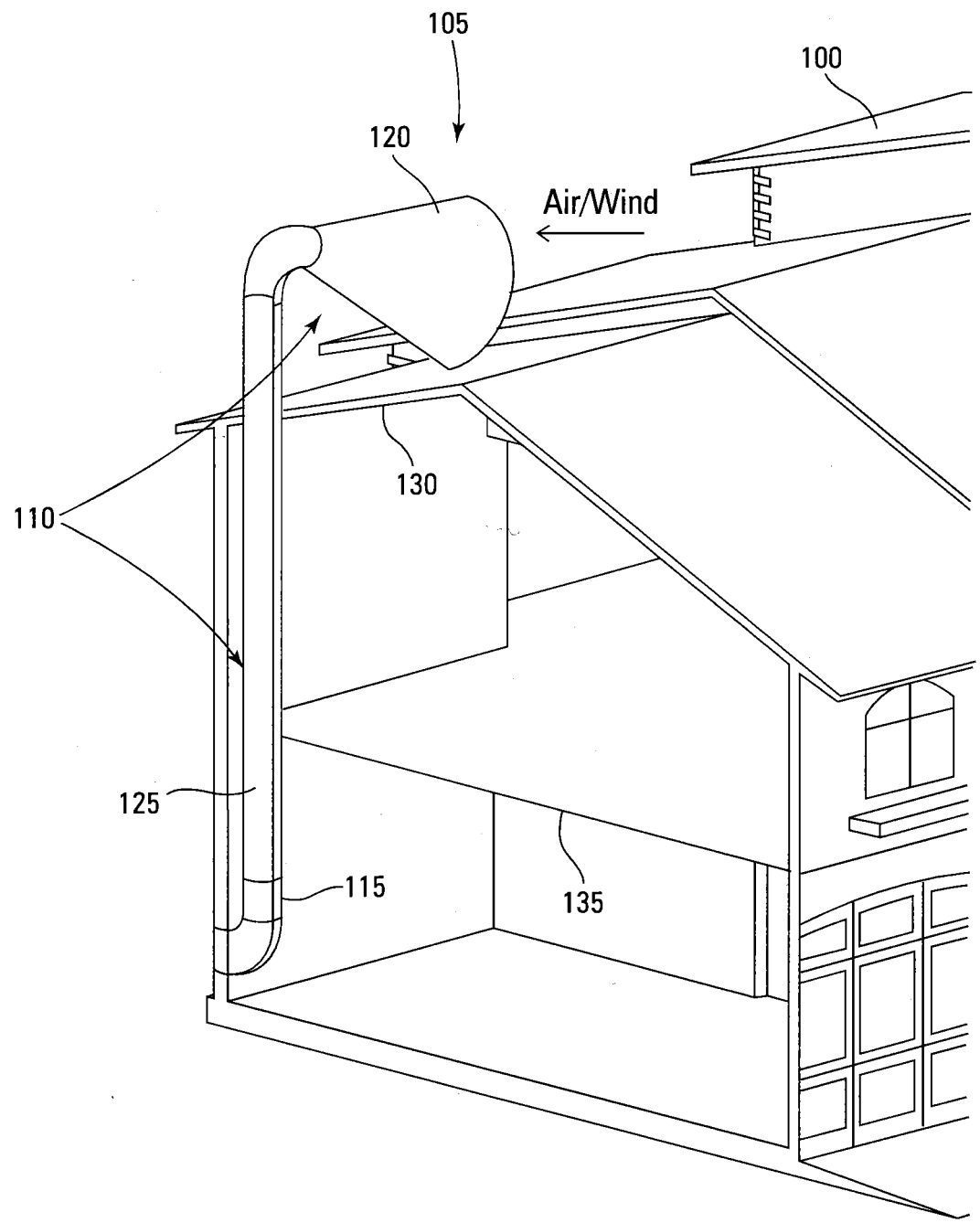
FIG. 1 is a cutaway perspective view of a building that includes at least one wind-energy-conversion system, according to an embodiment.

In the following detailed description, reference is made to the accompanying drawings that form a part hereof, and in which is shown, by way of illustration, specific embodiments. In the drawings, like numerals describe substantially similar components throughout the several views. Other embodiments may be utilized and structural changes may be made without departing from the scope of the present disclosure. The following detailed description is, therefore, not to be taken in a limiting sense.

In some embodiments, buildings include wind-energy-conversion systems. A wind-energy-conversion system may be integrated in a building or may be adjacent to a building. For some embodiments, a space within the building may be part of the wind-energy-conversion system and may be fluidly coupled to an energy extractor by a duct. Windows of the building that open to the space may serve as inlets to the wind-energy-conversion system.

A wind-energy-conversion system may be installed in a building as part of the fabrication of the building or may be added to an existing building. Buildings that might include a wind-energy-conversion system include single-family homes, multi-family apartments, office complexes, high-rises, (e.g., skyscrapers), industrial facilities, or any other buildings that require power.

In some embodiments, a wind-energy-conversion system might include a wind-delivery (e.g., a wind-intake) system that receives the wind, accelerates the wind, and delivers accelerated wind to an energy-extraction section that may include an energy extractor configured to output energy in response to receiving wind from the wind delivery system. For some embodiments, the energy extractor may extract energy from the wind for the purpose of generating electricity.

An energy extractor might include one or more turbines that convert the kinetic energy of the wind into mechanical (e.g., rotational) energy. The turbine may rotate an electrical generator that generates electrical power. For some embodiments, an energy extractor may include a plurality of turbines in series fluidly coupled to the wind-delivery system.

For other embodiments, an energy extractor might include one or more non-rotating generators that can produce electrical power. For example, a non-rotating generator might be a vibratory generator, e.g., configured to convert the kinetic energy of the wind into vibrational energy. The non-rotating generator may include an electrical-charge-producing material, such as a piezoelectric material, that can produce an electrical charge (e.g., that can output a voltage) when the generator vibrates in response to the wind flowing over the generator. The electrical power may be delivered to a storage battery, directly to an electrical load, and/or to a power grid. For some embodiments, an energy extractor may include a plurality of non-rotating generators in series fluidly coupled to the wind-delivery system. For other embodiments, an energy extractor might include one or more turbines and/or one or more non-rotating generators.

An exhaust system may be after the energy-extraction section. The portions of the delivery system and/or the exhaust system might be placed in the interior of the structure and/or adjacent to the structure and might intercept structural components of a building, such as a roof, ceiling, floor, walls, and/or foundation. The portions of the delivery system and/or the exhaust system might pass above or under ground level. The energy extractor might be within the interior or on the exterior of the building.

Advantages of using wind-energy-conversion systems in buildings include, but are not limited to, more efficient distribution of power, creation of multiple sub-grids to power specific load zones, machinery, or mechanical equipment, reduced noise and vibration, improved access to power networks and generating components, and efficient building construction methods.

For some embodiments, building aesthetics may be positively impacted by integration of the wind-delivery, energy-extractor, and/or wind-exhaust components into the building. Portions of a wind-energy-conversion system, such as portions of the delivery system, the energy extractor, and/or the exhaust system may also function as structural and support members. Portions of wind-energy-conversion system may be used to showcase or highlight the technology and electricity producing methods within a building. This might be accomplished, for example, by utilizing transparent components to show portions of the delivery system, the energy extractor, and/or the exhaust system.

FIG. 1 is a cutaway perspective view of a building 100 that includes at least one wind-energy-conversion system 105. For some embodiments, building 100 may include a plurality of wind-energy-conversion systems 105. Building 100 may be any type of building that requires power, such as, but not limited to, a home, an apartment complex, an office complex, a high-rise, an industrial facility, etc.

Wind-energy-conversion system 105 may include a wind-delivery system 110 that may be fluidly coupled to an energy-extraction section 115, e.g., an energy-extraction assembly, that may include an energy extractor. For example, an energy extractor may include one or more turbines and/or one or more non-rotating generators, etc. Wind-delivery system 110 may include a nozzle assembly 120 that is fluidly coupled to a duct 125 that is fluidly coupled to energy-extraction section 115. For example, duct 125 may be substantially vertical (e.g., vertical).

For some embodiments, at least a portion of duct 125 may be located within an interior of building 100. For example, duct 125 may pass through a roof 130 of building 110 and through one or more floors 135 of building 100, as shown in FIG. 1. For example, duct 125 may pass through an opening in the roof and opening in each of the floors it passes through. For other embodiments, duct 125 may be an elevator shaft in building 100.

Figure 2:
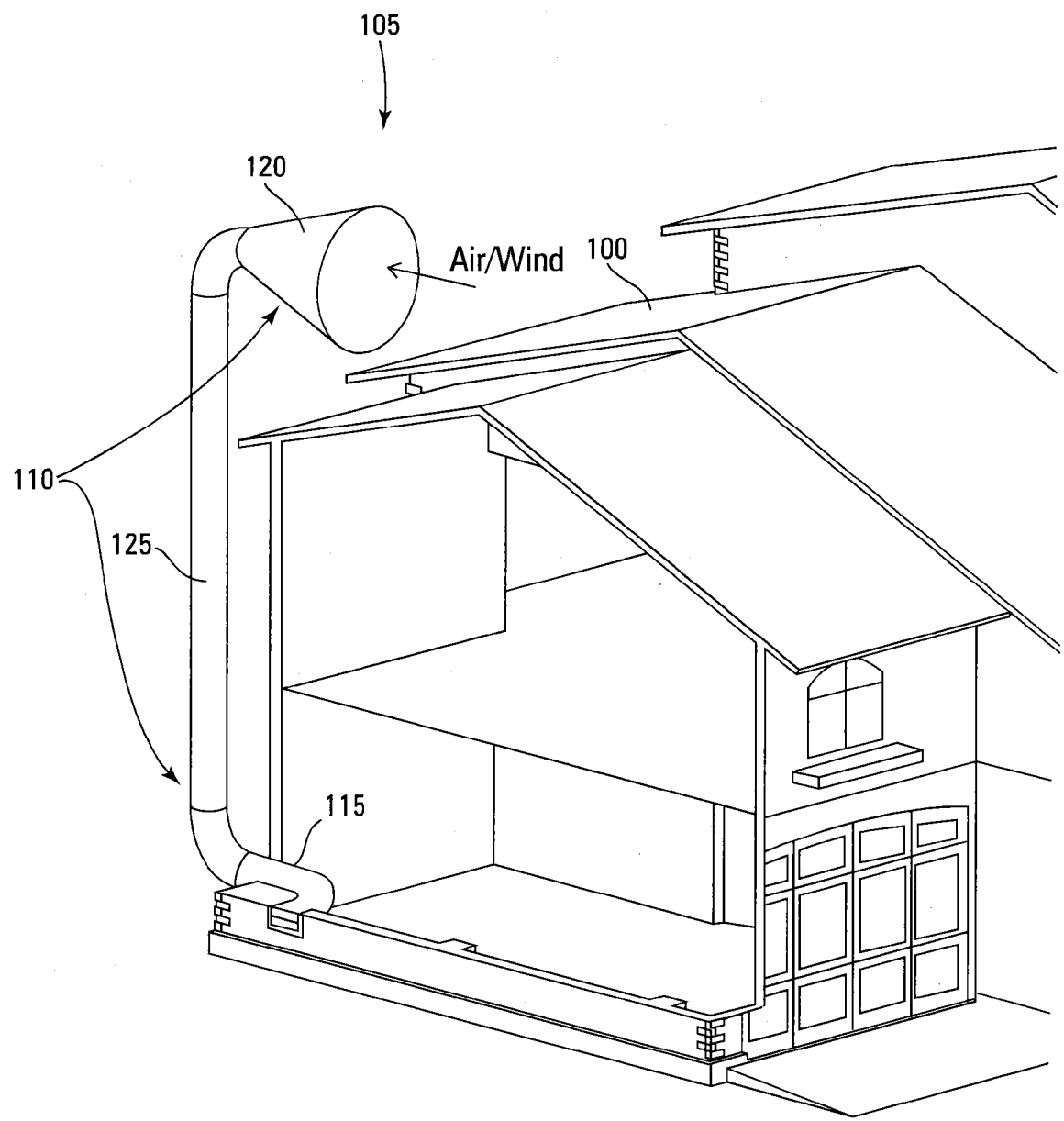
FIG. 2 illustrates a wind-delivery system of a wind-energy-conversion system located external to a building, according to another embodiment.

For some embodiments, wind-energy-conversion system 105 may be fabricated as a part of a method for fabricating building 100. For other embodiments, wind-energy-conversion system 105 may be installed after building 100 is fabricated, e.g., as an add-on. For some embodiments, wind-delivery system 110 may be located on an exterior of building 100, as shown in FIG. 2. For some embodiments, the energy-extraction section 115, and the energy extractor therein, may be in the interior of building 100, as shown in FIGS. 1 and 2, e.g., adjacent to ground level or below ground level (e.g., in a basement of building 100).

For embodiments where an energy extractor includes a turbine, an electrical generator coupled to that turbine might be in the interior of building 100. Alternatively, energy-extraction section 115 may be located externally to building 100. An advantage of locating the electrical generator in the interior of building 100 is to protect the electrical generator from the outdoor environment. This is not possible with some existing solar or wind technologies.

Figure 3:
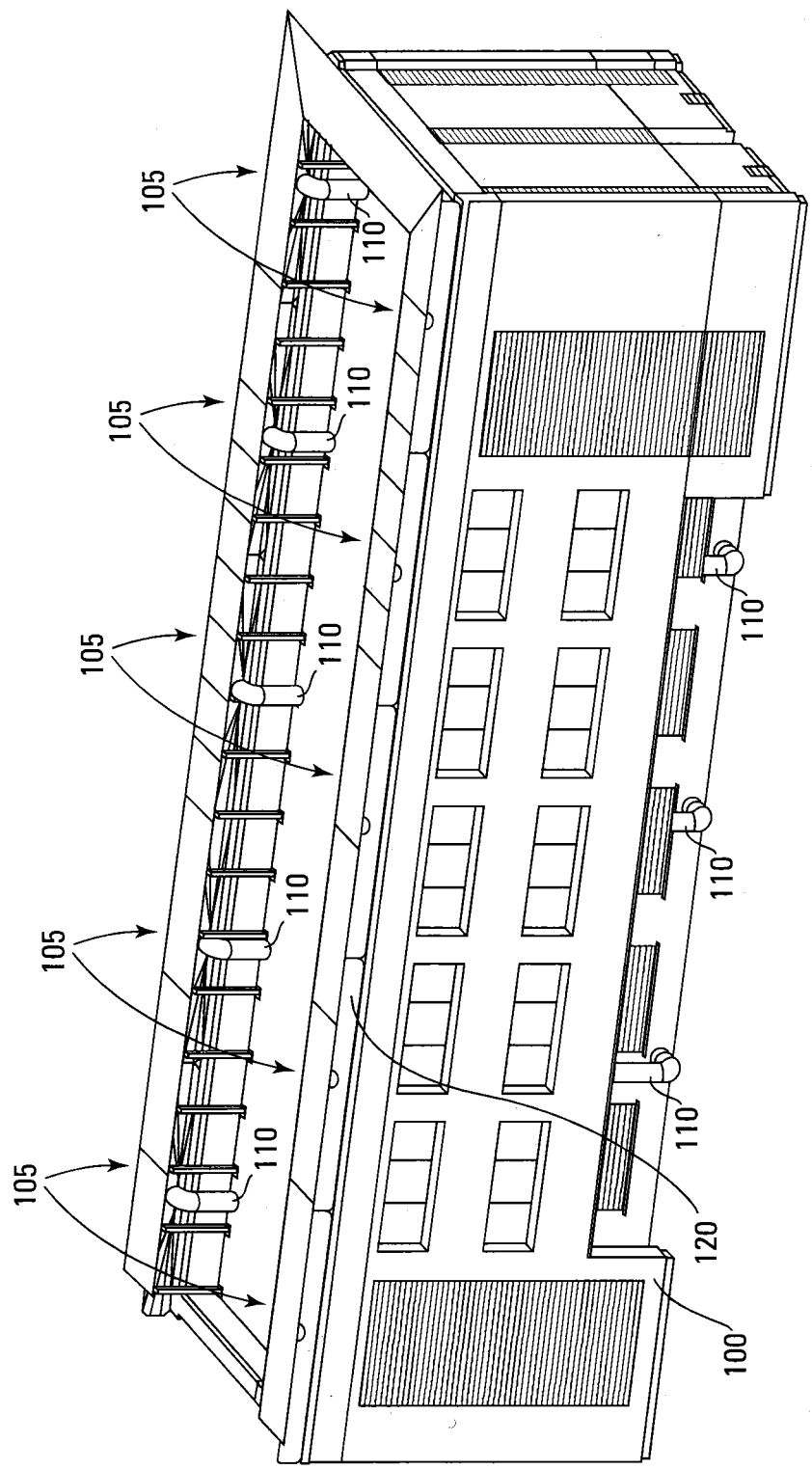
FIG. 3 is an example of a building having a plurality of wind-energy-conversion systems, according to another embodiment.

FIG. 3 is an example of a building 100 having a plurality of wind-energy-conversion systems 105. For example, the nozzle assemblies 120 of wind-energy-conversion systems 105 might be arranged along an upper edge of building 100. For other embodiments, the plurality of delivery systems 110 in FIG. 3 might be fluidly coupled to a single energy-extraction section 115 (not shown in FIG. 3) in which embodiments, building 100 has a single wind-energy-conversion system 105 with a single energy-extraction section 115 and a plurality of delivery systems 110 fluidly coupled to the single energy-extraction section 115. Note that an energy-extraction section 115 may include an energy extractor that may include one or more turbines and/or one or more non-rotating generators.

Figure 4:
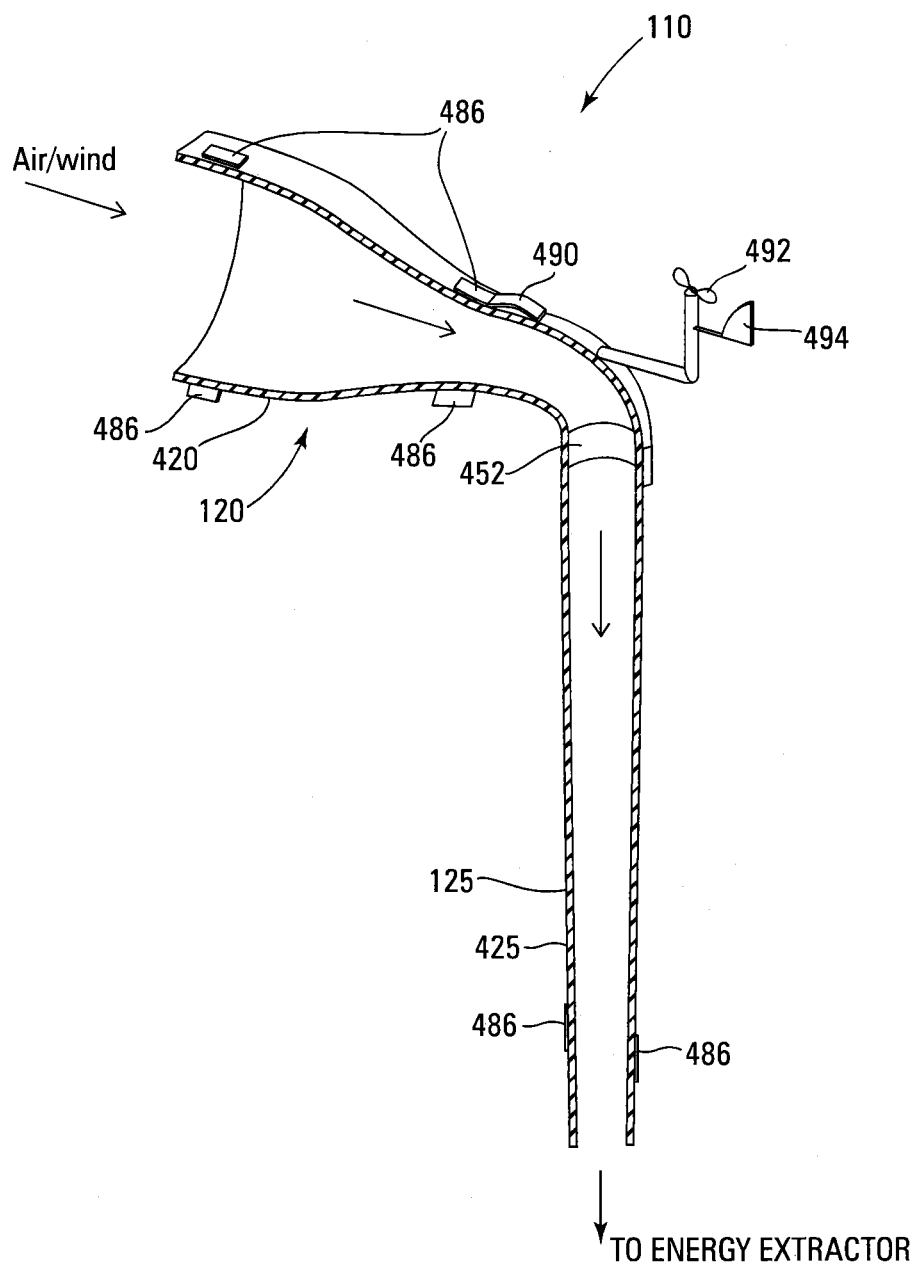
FIG. 4 is a cutaway perspective view of an example of a wind-delivery system of a wind-energy-conversion system, according to another embodiment.

FIG. 4 is a cutaway perspective view of another example of a wind-delivery system 110 of a wind-energy-conversion system 105. In the example of FIG. 4, the nozzle assembly 120 includes a substantially horizontal (e.g., a horizontal) converging nozzle 420 that converges in the direction of the wind that flows therethrough during operation. Duct 125 might include a substantially vertical (e.g., a vertical) converging nozzle 425 that converges in the direction of the wind that flows therethrough during operation for some embodiments, as shown in FIG. 4. Nozzle 420 may be rotatably coupled to duct 125, and thus nozzle 425, e.g., by a bearing 452, so that nozzle 420 can rotate relative to duct 125. Note that nozzle 420 have a circular, square, rectangular, or any polygonal cross-sectional shape.

Note that duct 125, and thus nozzle 425, is fluidly coupled to energy-extraction section 115. As such, nozzle 420 accelerates the wind and directs the accelerated wind to nozzle 425. Nozzle 425 further accelerates the wind from nozzle 420 and directs the further accelerated wind to energy-extraction section 115.

Actuators 486, e.g., piezoelectric actuators, may be physically coupled to the outer surface of nozzle 420 and/or the outer surface of nozzle 425. For example, actuators 486 may be coupled in direct physical contact with the outer surface of nozzle 420 and/or the outer surface of nozzle 425. Actuators 486 may be communicatively coupled (e.g., electrically coupled, wirelessly coupled, etc.) to a controller 490 for receiving signals (e.g., electrical signals over wires, wireless signals, etc.) from controller 490.

A wind-speed sensor, such as an anemometer 492, may be mounted on wind-delivery system 110. Anemometer 492 may be communicatively coupled (e.g., electrically coupled, wirelessly coupled, etc.) to controller 490 for sending signals (e.g., electrical signals over wires, wireless signals, etc.) to controller 490 indicative of the sensed wind speed. A wind-direction sensor, such as a wind vane 494, may be mounted on wind-delivery system 110 for sensing the wind direction. Wind vane 494 catches the wind and rotates nozzle 420 relative to duct 125 such that nozzle 420 is directed into the wind.

For another embodiment, upon receiving signals (e.g., electrical signals over wires, wireless signals, etc.) from wind vane 494, controller 490 may send signals (e.g., electrical signals over wires, wireless signals, etc.) to a yaw motor (not shown) located adjacent to bearing 452. A yaw drive (not shown) may mechanically couple the yaw motor to nozzle 420. The signals instruct the yaw motor to activate the yaw drive that in turn rotates nozzle 420 such that nozzle 420 is directed into the wind.

In response to receiving signals indicative of the wind speed from anemometer 492, controller 490 may send signals (e.g., electrical signals over wires, wireless signals, etc.) based on the wind speed to actuators 186. Actuators 186 may then adjust the size and/or shape of nozzle 420 and/or the size and/or shape of nozzle 425 by exerting forces on the outer surface of nozzle 420 and/or the outer surface of nozzle 425 based on the wind speed. That is, the size and/or shape of nozzle 420 and/or the size and/or shape nozzle 425 may be adjusted based on the wind speed. For example, actuators 486 may adjust one or more diameters of nozzle 420 and/or one or more diameters of nozzle 425.

Figure 5:
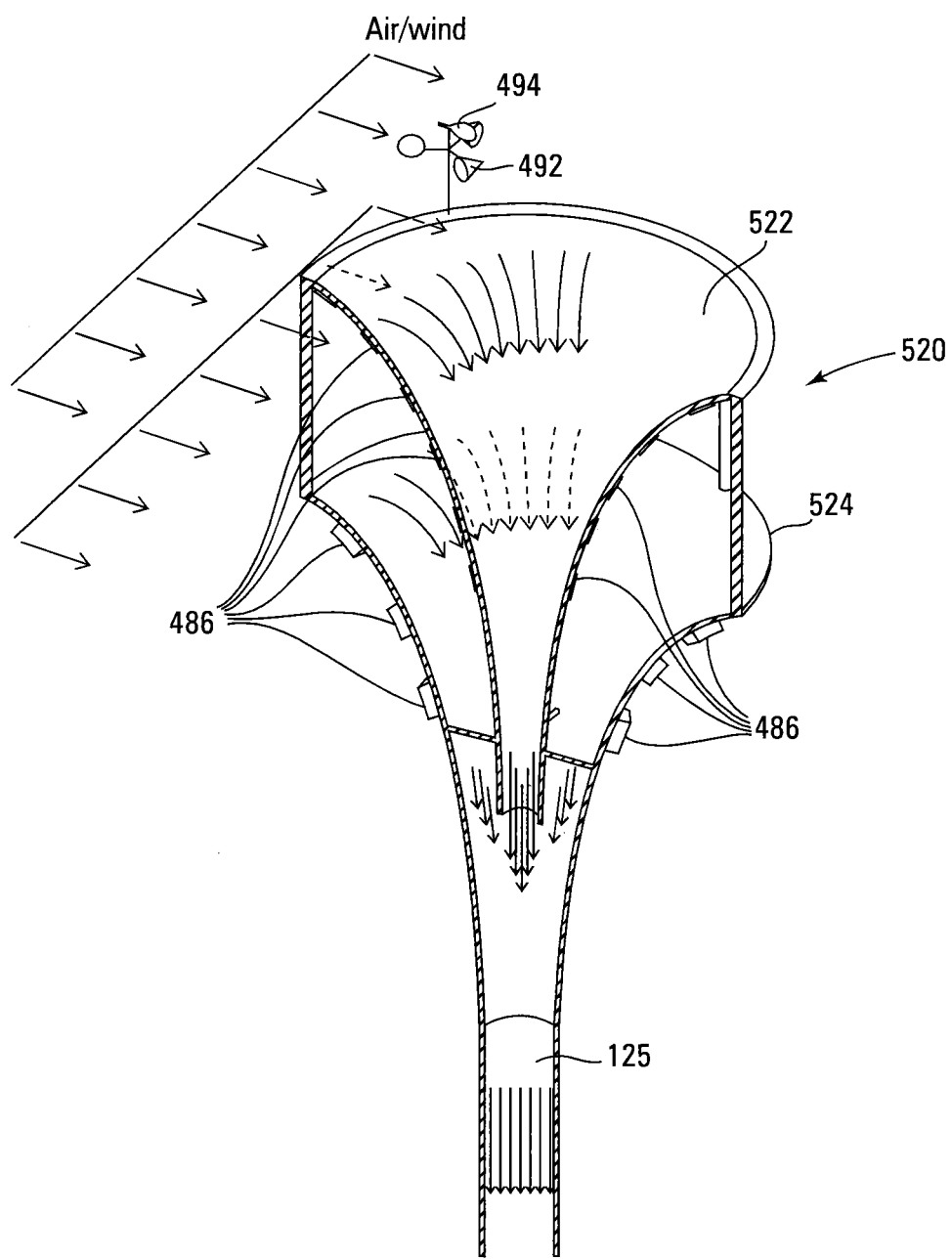
FIG. 5 is a cutaway view of a nozzle assembly of a wind-energy-conversion system, according to another embodiment.

FIG. 5 is a cutaway view of a nozzle assembly 520 that may replace nozzle assembly 120 in FIGS. 1-4 in some embodiments. For example, nozzle assembly 520 may be fluidly coupled to duct 125 and thus nozzle 425 (FIG. 4).

Nozzle assembly 520 may include a substantially vertical (e.g., a vertical) converging nozzle 522 and a substantially vertical (e.g., a vertical) converging nozzle 524. Nozzle 522 may extend into nozzle 524 and may be substantially coaxial with (e.g., coaxial with) nozzle 524. The inlet to nozzle 522 is at a vertical level above the inlet to nozzle 524. Nozzles 522 and 524 may be fluidly coupled to duct 125 and thus nozzle 425. The outer surface of nozzle 522 may act as a deflector that can deflect wind into nozzle 524.

Wind may enter nozzle assembly 520 at substantially any direction, such as at substantially 360 degrees (e.g., at 360 degrees) around nozzle assembly 520. This avoids the need for turning an inlet of a wind-energy-conversion system or a turbine of a wind-energy-conversion system into the wind, e.g., thereby eliminating the need for yaw system.

Actuators 486 may be physically coupled to nozzle 522 and/or nozzle 524, e.g., in direct contact with an outer surface of nozzle 522 and/or an outer surface of nozzle 524. Actuators 486 may be communicatively coupled (e.g., electrically coupled, wirelessly coupled, etc.) to a controller, such as controller 490. The controller may be configured to send signals, such as electrical signals over wires, wireless signals, etc., to actuators 486 based on a wind speed detected by anemometer 492, which sends signals, such as electrical signals over wires, wireless signals, etc., to the controller indicative of the wind speed.

The actuators 486 coupled to nozzle 522 adjust the size and/or shape of nozzle 522 by exerting forces on nozzle 522 in response to receiving the signals from the controller, and/or the actuators 486 coupled to nozzle 524 adjust the size and/or shape of nozzle 524 by exerting forces on nozzle 524 in response to receiving the signals from the controller. For example, the size and/or shape of nozzle 522 and/or nozzle 524 may be adjusted based on wind speed. Note that the actuators 486 coupled to nozzle 425, and thus duct 125, may adjust the size and/or shape of nozzle 425, and thus duct 125, in response to signals from the controller.

Figure 6:
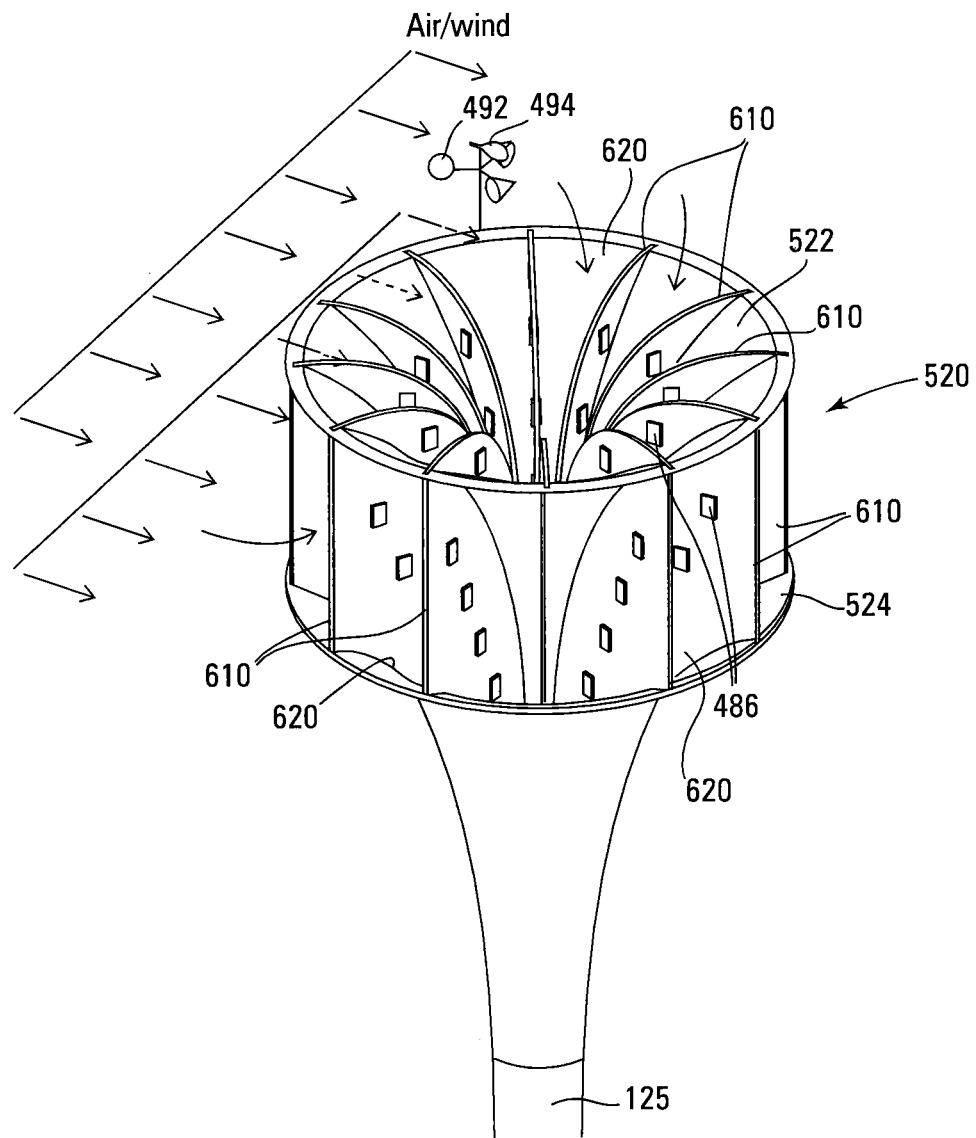
FIG. 6 illustrates a nozzle assembly of a wind-energy-conversion system, according to another embodiment.

For some embodiments, a plurality of vanes 610 might extend into an interior of at least one of nozzle 522 and nozzle 524, e.g., so that a converging flow passage 620 is between each of adjacent vanes 610 of the plurality of vanes 610, as shown in FIG. 6. Actuators 486 may be coupled to (e.g., in direct contact with) each of the vanes 610 extending into nozzle 522 and nozzle 524. Although not shown in FIG. 6, actuators 486 may also be coupled to nozzle 522 and nozzle 524, as shown in FIG. 5.

The actuators 486 that may be physically coupled to each of the vanes 610 may be coupled (e.g., electrically by wires, wirelessly, etc.) to the controller in addition to the actuators 486 that may be coupled to nozzle 522 and nozzle 524. The controller may be configured to send signals (e.g., wireless signals over wires, wireless signals, etc.) to actuators 486 based on a wind speed. Actuators 486 may adjust the size and/or shape of converging flow passages 620 by exerting forces on the plurality of vanes 610, nozzle 522, and/or nozzle 524 in response to receiving signals from the controller based on wind speed.

Figure 7:
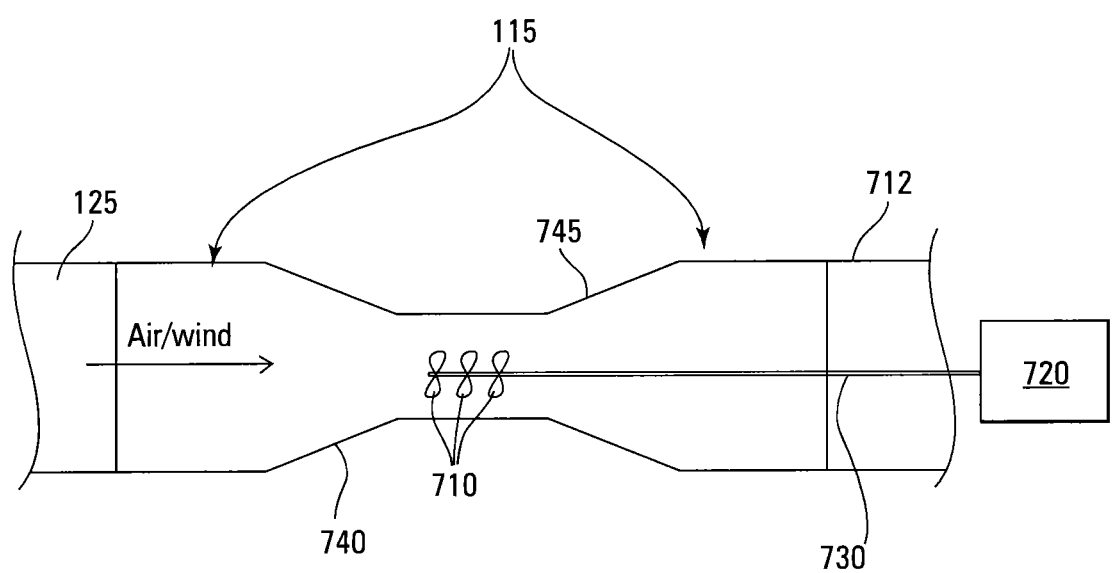
FIG. 7 illustrates an energy-extraction section of a wind-energy-conversion system, according to another embodiment.
Figure 8:
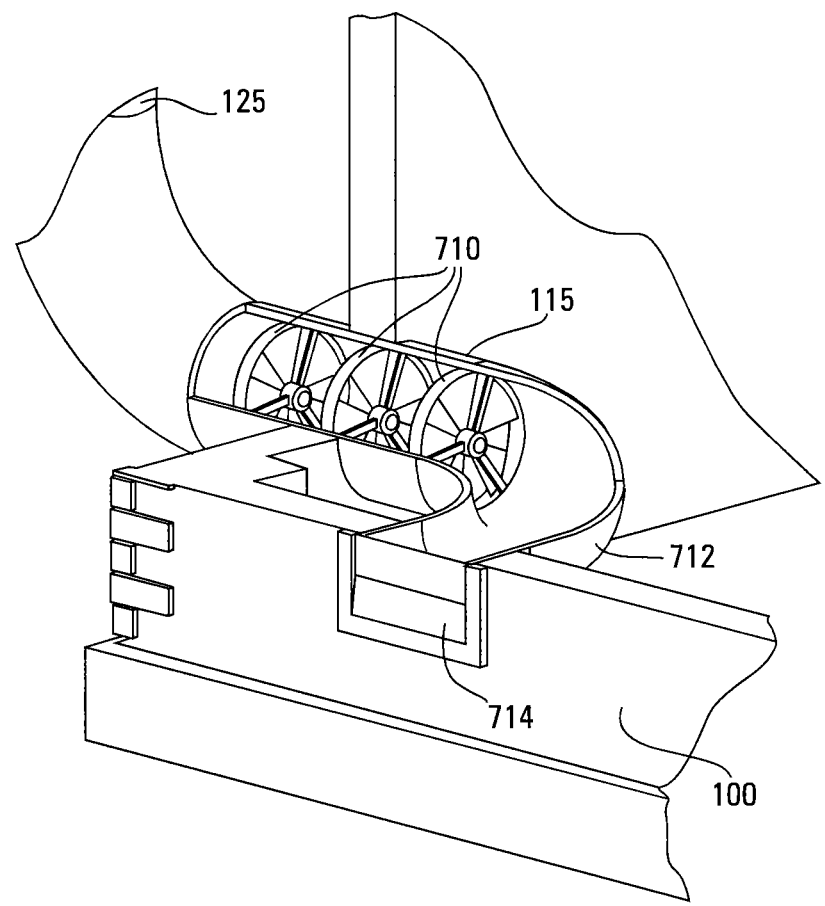
FIG. 8 illustrates an energy-extraction section of a wind-energy-conversion system, where the energy-extraction section has one or more horizontal-axis turbines, according to another embodiment.
Figure 9:
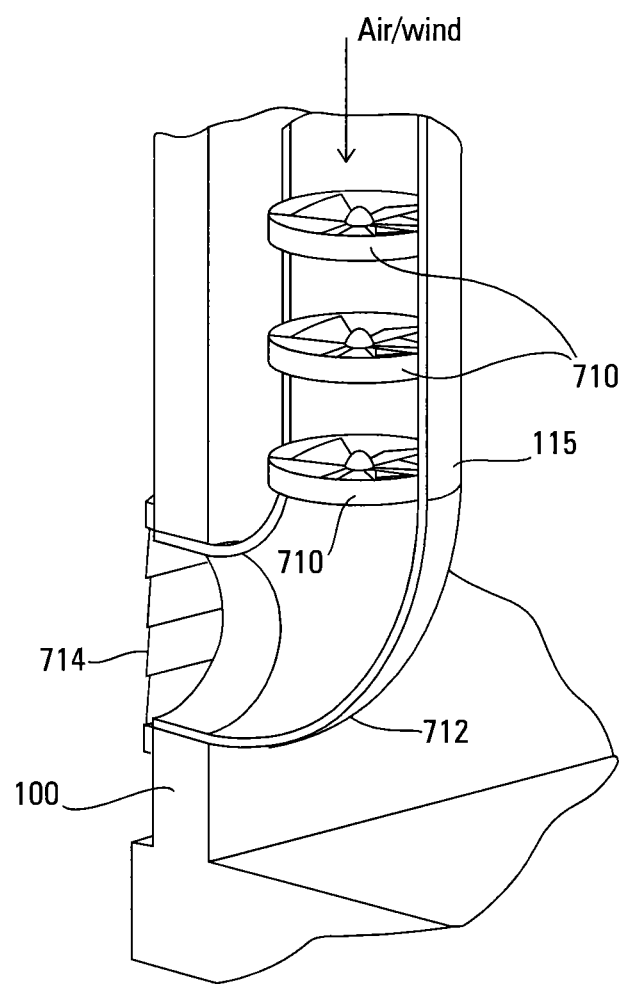
FIG. 9 illustrates an energy-extraction section of a wind-energy-conversion system, where the energy-extraction section has one or more vertical-axis turbines, according to another embodiment.

FIGS. 7, 8, and 9 illustrate that for some embodiments, the energy extractor in energy-extraction section 115 may include one or more turbines 710. In the examples of FIGS. 7 and 8, energy-extraction section 115 may be substantially horizontal (e.g., horizontal). As such, the one or more turbines 710 in FIGS. 7 and 8 may be horizontal-axis turbines. In the example of FIG. 9, energy-extraction section 115 may be substantially vertical (e.g., vertical), and thus the one or more turbines 710 in FIG. 9 may be vertical-axis turbines.

For some embodiments, the wind exhausting from energy-extraction section 115, may be directed through an opening in a wall in building 100, e.g., by an exhaust duct 712, as shown in FIGS. 8 and 9. For example, the opening may be covered by louvers 714 that may be normally biased to close the opening. Louvers 714 may be configured to be opened by the wind exhausting from energy-extraction section 115.

For some embodiments, the turbines 710 may be in series as shown in FIGS. 7-9. For example, the turbines 710 in series may be mechanically coupled to an electrical generator 720 by a shaft 730, as shown in FIG. 7. During operation, wind from duct 125 flows over blades of turbines 710, causing the turbines 710 to rotate shaft 730, which in turn rotates generator 720. Generator 720 may be a geared or gearless generator, a high-speed generator, e.g., of the type sometimes used for natural-gas applications, etc.

Figure 10A:
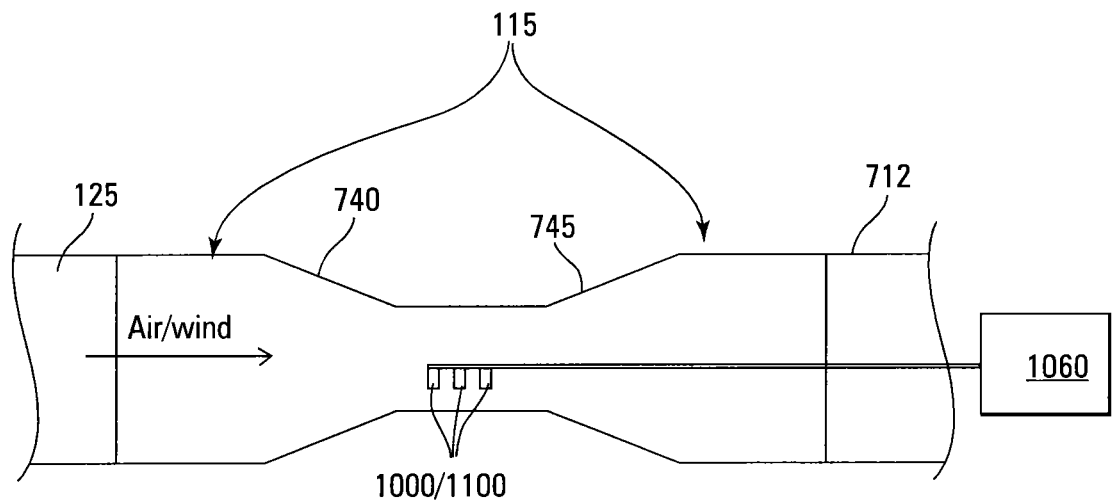
FIG. 10A illustrates an energy-extraction section of a wind-energy-conversion system, where the energy-extraction section has one or more non-rotating generators, according to another embodiment.
Figure 10B:
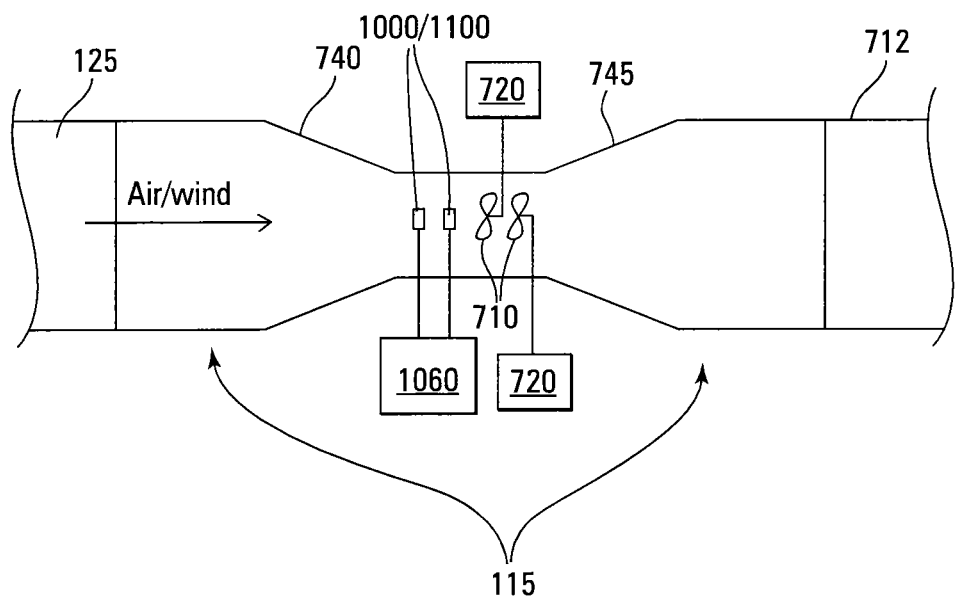
FIG. 10B illustrates an energy-extraction section of a wind-energy-conversion system, where the energy-extraction section has one or more turbines and one or more non-rotating generators, according to another embodiment.

Alternatively, in other embodiments, the turbines 710 in series may be coupled to respective ones of a plurality of electrical generators 720, as shown in FIG. 10B. That is, each turbine 710 of the turbines 710 in series may be individually coupled to a single electrical generator 720.

For some embodiments, energy-extraction section 115 may include a converging nozzle 740 that is downstream from and that is fluidly coupled to duct 125. Converging nozzle 740 converges in the direction of the wind flow in nozzle 740. Energy-extraction section 115 may include a diffuser 745 that is downstream from and that is fluidly coupled to the one or more turbines 710. Diffuser 745 diverges in the direction of the wind flow in diffuser 745. For example, energy-extraction section 115 may be a Venturi tube for some embodiments.

Nozzle 740 may be between duct 125 and the one or more turbines 710. The one or more turbines 710 may be between nozzle 740 and diffuser 745. For some embodiments, exhaust duct 712 may be downstream of diffuser 745 and may be fluidly coupled thereto.

In the example of FIG. 10A, the energy extractor in energy-extraction section 115 may include one or more non-rotating vibratory generators 1000 in series. Each generator 1000 may include an electrical-charge-producing (e.g., a voltage-producing) material, such as a piezoelectric material. A generator 1000 may be configured to vibrate in response to a fluid (e.g., to wind) flowing thereover, and the electrical-charge-producing material may be configured to produce an alternating electrical charge (e.g., voltage) in response to the generator 1000 vibrating. Note that one or more generators 1000 may replace the turbines 710 in the energy-extractor-sections 115 in FIGS. 7, 8, and 9. As such, one or more generators 1000 may be between nozzle 740 and diffuser 745. Also note that common numbering is used in FIGS. 7, 10A, and 10B to denote similar (e.g., the same) components.

In the example of FIG. 10B, the energy extractor in energy-extraction section 115 may include one or more turbines 710 in series with one or more non-rotating vibratory generators 1000. For example, a plurality of turbines 710 in series may be in series with a plurality of non-rotating vibratory generators 1000 in series. Where there is a plurality of turbines 710 in series, each turbine 710 may be individually coupled to a single electric generator 720, for some embodiments. In other embodiments, the plurality of turbines 710 in series coupled to a single generator, as shown in FIG. 10A, may replace the turbines 710 individually coupled to single electric generators 720 in FIG. 10B.

Figure 11:
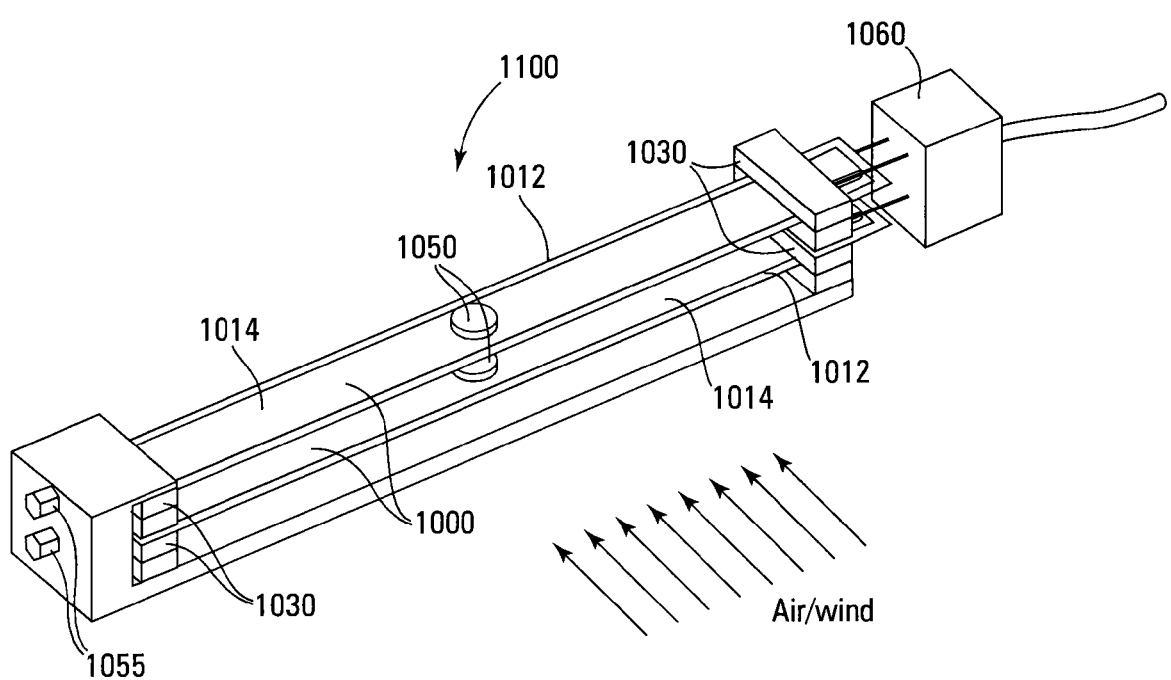
FIG. 11 is an example of an energy extractor having a plurality of non-rotating vibratory generators, according to another embodiment.

FIG. 11 is an example of a non-rotating-vibratory-generator system 1100 having one or more, such as a plurality (e.g. a stack) of, non-rotating vibratory generators 1000. Each non-rotating vibratory generator 1000 may have an electrical-charge-producing material 1012 that may be interposed between a pair electrodes 1014. A boundary constraint, such as an end boundary constraint 1030, may be physically coupled to each generator 1000. For example, an end boundary constraint 1030 may be coupled to one or both ends of each generator 1000. One or more masses 1050 may be located on each generator 1000. For example, masses 1050 may be active masses, e.g., shape memory materials that can deform in response to an electrical current applied thereto, or passive masses. A tension adjuster 1055 may be physically coupled to the end of each generator 1000. For some embodiments, the energy extractor in energy-extraction section 115 may include a plurality of non-rotating-vibratory-generator systems 1100 in series, as shown in FIG. 10A or 10B, or may include one or more non-rotating-vibratory-generator systems 1100 in series with one or more turbines 710, as shown in FIG. 10B.

A controller 1060 may be coupled (e.g., electrically by wires or wirelessly) to each generator 1000 (FIGS. 10A, 10B, and 11) and to the boundary constraints, the active masses, and the tension adjuster 1055 (FIG. 11). The controller 1060 may be configured to cause at least one of a stiffness of a boundary constraint, such as an end boundary constraint 1030, a distribution of an active mass, and a tension exerted by a tension adjuster 1055 on a generator 1000 to be adjusted based on a flow rate of the wind flowing in energy-extraction section 115 and/or a power generated by the generator 1000. A converter either separate from or incorporated in controller 1060 may be electrically coupled to a generator 1000 and may be configured to convert an AC voltage generated by the vibration of the generator 1000 to DC voltage.

Figure 12:
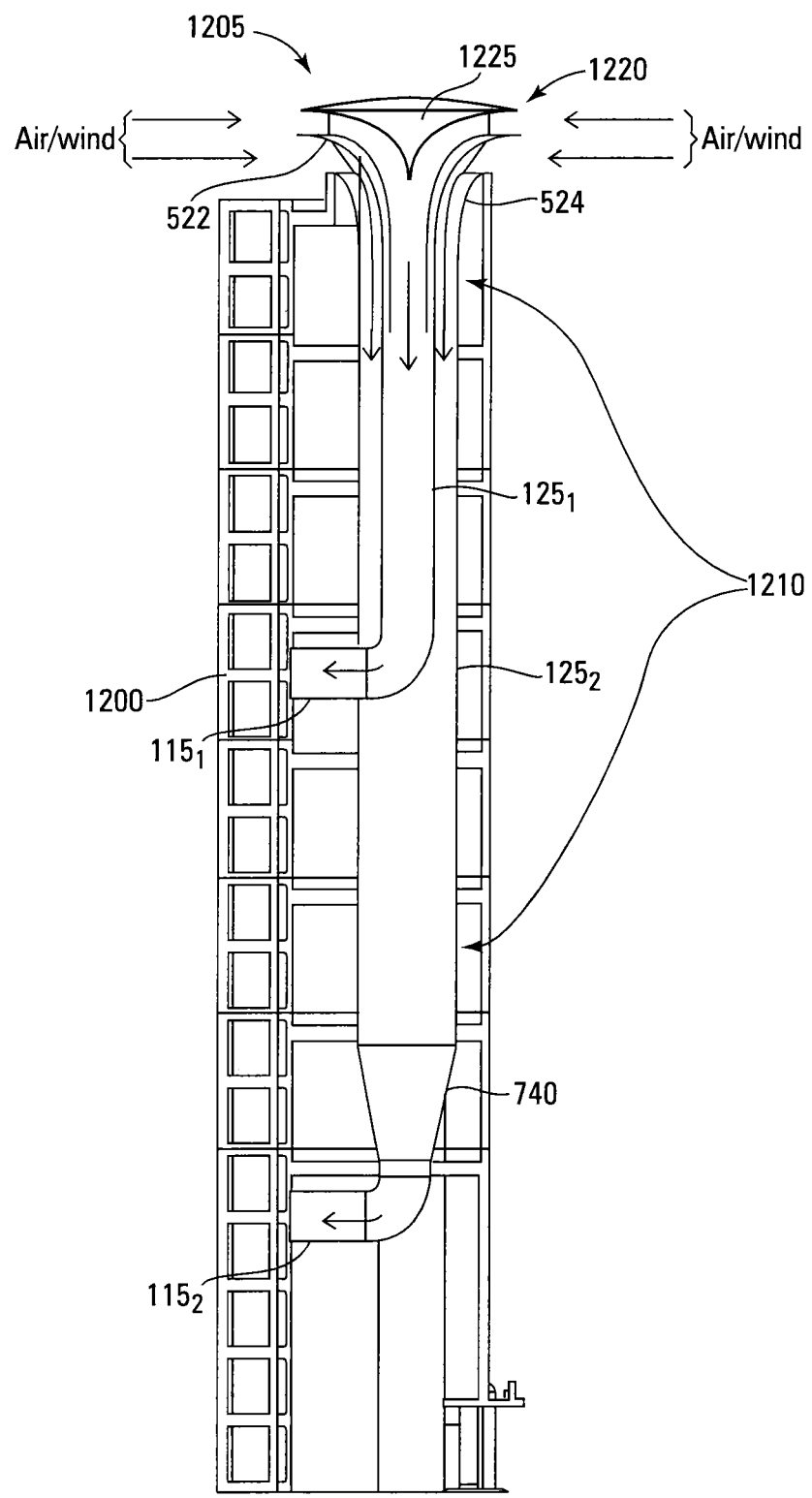
FIG. 12 illustrates a building having a wind-energy-conversion system, according to another embodiment.

FIG. 12 illustrates a building 1200, such as high-rise building, having a wind-energy-conversion system 1205. Wind-energy-conversion system 1205 may be installed as part of a method of constructing building 1200 or installed after building 1200 is constructed, e.g., as a retrofit (e.g., as an add-on) to building 1200.

Wind-energy-conversion system 1205 may include a wind-delivery system 1210 that may be fluidly coupled to energy-extraction sections 115 (e.g., energy-extraction sections $115_1$ and $115_2$), where each energy-extraction section 115 may be as discussed above in conjunction with FIGS. 1, 7-9, 10A, and 10B. Each of energy-extraction sections $115_1$ and $115_2$ may include an energy extractor that may include one or more turbines 710, such as shown in FIGS. 7-9 and 10B, one or more non-rotating vibratory generators 1000, such as shown in FIGS. 10A and 10B, one or more non-rotating-vibratory-generator systems 1100, such as shown in FIGS. 10A, 10B, and 11, one or more turbines 710 and one or more non-rotating vibratory generators 1000, such as shown in FIG. 10B, or one or more turbines 710 and one or more non-rotating-vibratory-generator systems 1100, such as shown in FIG. 10B.

Wind-delivery system 1210 of wind-energy-conversion system 1205 may include a nozzle assembly 1220 that may include the substantially vertical (e.g., a vertical) converging nozzle 522 and the substantially vertical (e.g., the vertical) converging nozzle 524. Nozzle 522 may extend into and may be substantially coaxial with (e.g., coaxial with) nozzle 524. The inlet to nozzle 522 is at a vertical level above the inlet to nozzle 524. Wind may enter nozzle assembly 1220 at substantially any direction, such as at substantially 360 degrees (e.g., at 360 degrees) around nozzle assembly 1220. This avoids the need for turning an inlet of a wind-energy-conversion system or a turbine of a wind-energy-conversion system into the wind, e.g., thereby eliminating the need for yaw system.

As indicated above in conjunction with FIG. 5, actuators (not shown in FIG. 12), such as actuators 486, may be coupled to nozzle 522 and/or nozzle 524 and may be coupled (e.g., electrically by wires or wirelessly) to a controller so that the actuators can adjust the size and/or shape of nozzle 522 and/or of nozzle 524 by exerting forces on nozzle 522 and/or nozzle 524 in response to receiving signals (e.g., electrical signals through wires or wireless signals) from the controller that are based on the wind speed.

An object 1225 may extend into nozzle 522 and may act to deflect the wind into nozzle 522. For some embodiments, nozzle assembly 1220 may be the same as the nozzle assembly 520 in FIG. 5, except with object 1225 extending into nozzle 522. Note that nozzle assembly 1220 may extend above the roof of building 1200, so wind can enter nozzle assembly 1220. For example, inlets to nozzles 522 and 524 may be above the roof of building 1200.

For some embodiments, nozzle 522 may be fluidly coupled to duct $125_1$ that may be fluidly coupled to energy-extraction section $115_1$, and nozzle 524 may be fluidly coupled to duct $125_2$ that may be fluidly coupled to energy-extraction section $115_2$. For some embodiments, a portion of duct $125_1$ may be in duct $125_2$ and may pass through a wall of duct $125_2$ to couple to energy-extraction section $115_1$, as shown in FIG. 12.

For example, ducts $125_1$ and $125_2$ might be independent of each other, e.g., the flow passages in ducts $125_1$ and $125_2$ might not be in communication with each other. As such, the energy extractors in energy-extraction sections $115_1$ and $115_2$ respectively fluidly coupled to ducts $125_1$ and $125_2$ might operate independently of each other. Note that each of ducts $125_1$ and $125_2$ may be as described above in conjunction with FIG. 4 and may include a converging nozzle 425 and may have actuators 486 on their outer surfaces that are coupled (e.g., electrically by wires or wirelessly) to the controller that is coupled (e.g., electrically by wires or wirelessly) to the actuators 486 coupled to nozzles 522 and 524.

Note that the energy extractors respectively in energy-extraction sections $115_1$ and $115_2$ might be at different vertical levels (e.g., might be on different floors) of building 1200. For example, the energy extractor in energy-extraction section $115_1$ might be located on a floor that is above the floor on which the energy extractor in energy-extraction section $115_2$ is located.

Figure 13A:
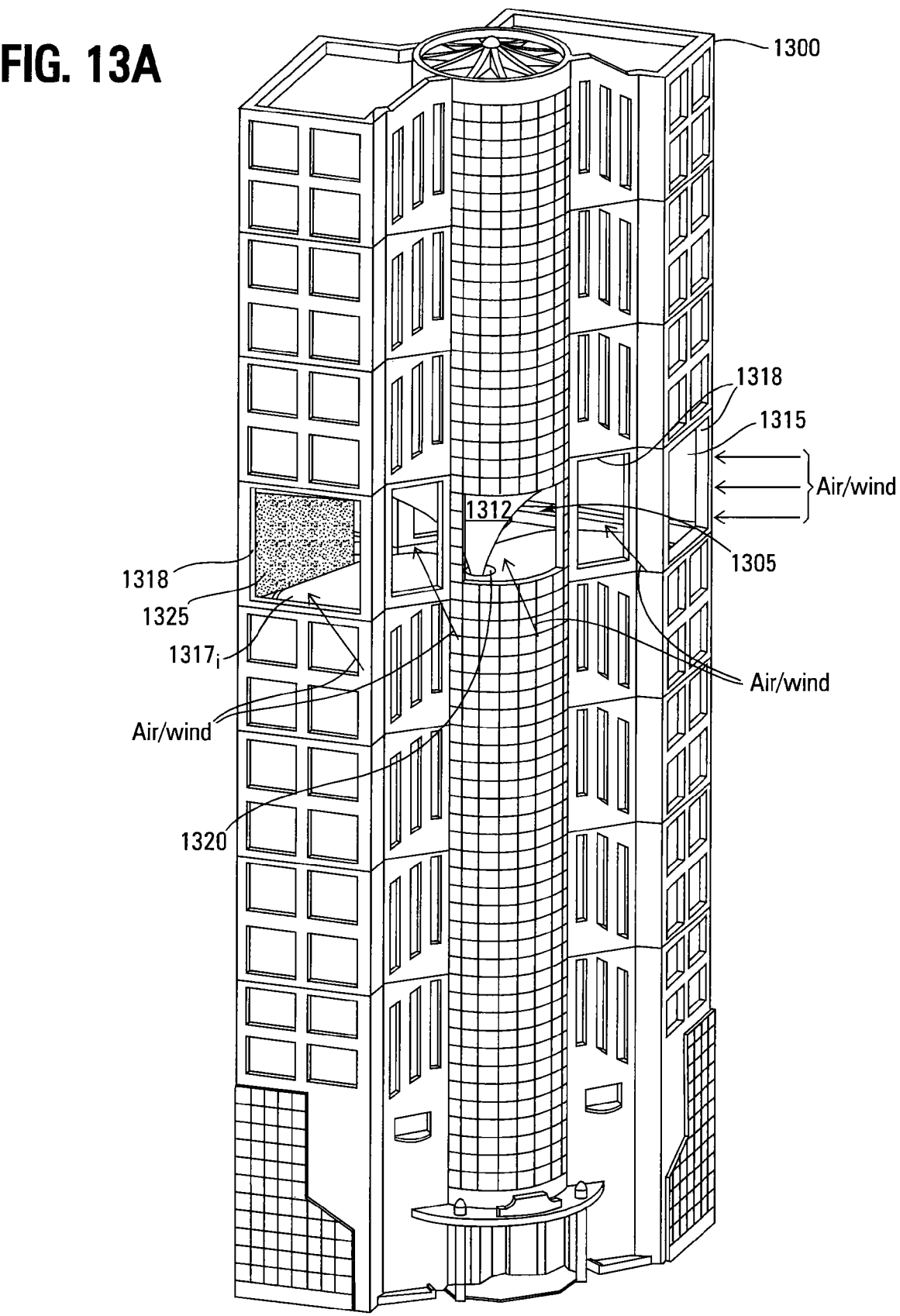
FIG. 13A illustrates a building having a wind-energy-conversion system that includes at least one space of the building, according to another embodiment.
Figure 13B:
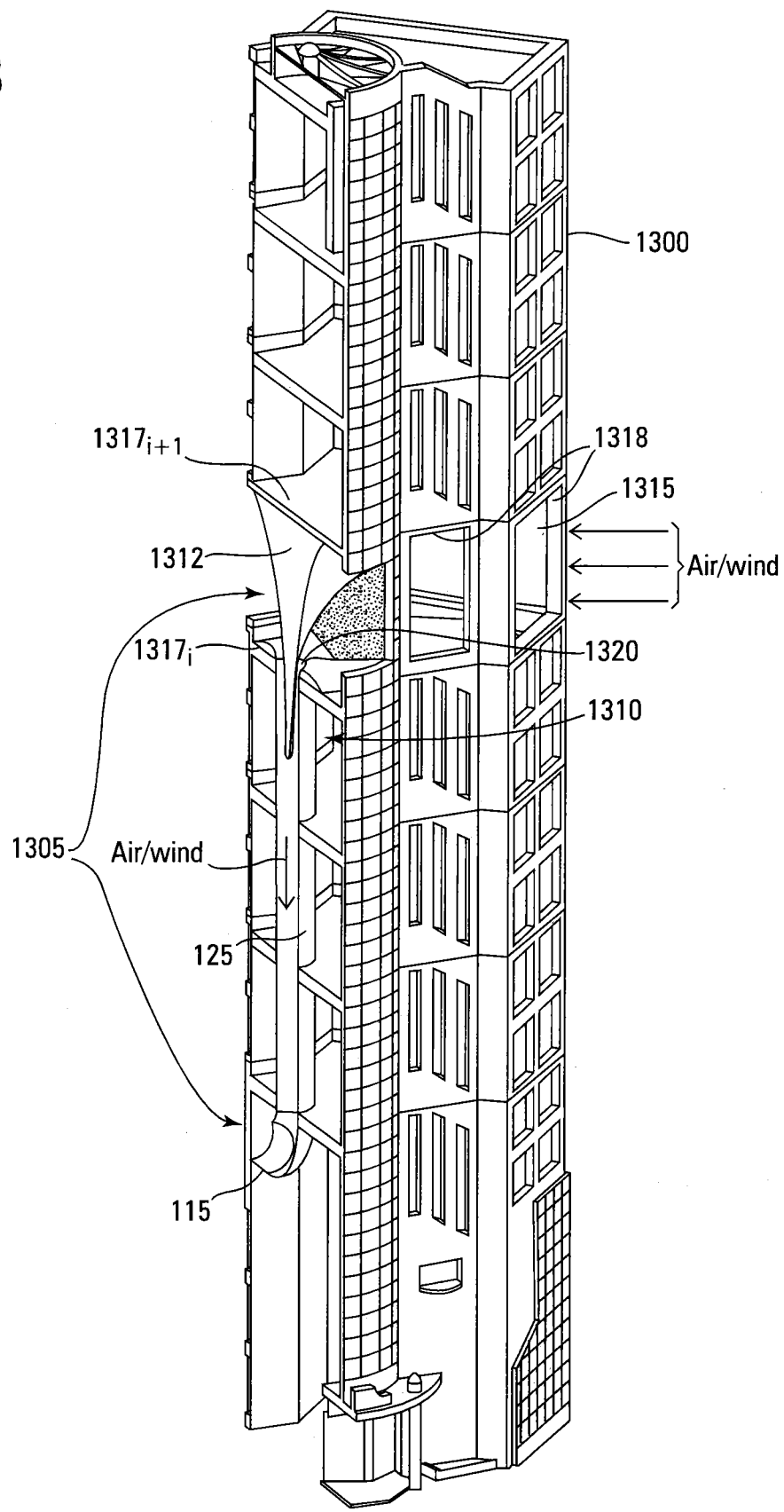
FIG. 13B is a cutaway view of FIG. 13A.

FIGS. 13A and 13B illustrate a building 1300, such as high-rise building, having a wind-energy-conversion system 1305, where FIG. 13B is a cutaway view of FIG. 13A. Wind-energy-conversion system 1305 may be installed as part of a method of constructing building 1300 or installed after building 1300 is constructed, e.g., as a retrofit (e.g., as an add-on) to building 1300.

For some embodiments, wind-energy-conversion system 1305 may include a wind-delivery system 1310 that is fluidly coupled to an energy-extraction section 115, where energy-extraction section 115 may be as discussed above in conjunction with FIGS. 1, 7-9, 10A, and 10B. For example, the energy extraction section 115 of wind-energy-conversion system 1305 may include an energy extractor that may include one or more turbines 710, such as shown in FIGS. 7-9, and 10B, one or more non-rotating vibratory generators 1000, such as shown in FIGS. 10A and 10B, one or more non-rotating-vibratory-generator systems 1100, such as shown in FIGS. 10A, 10B, and 11, one or more turbines 710 and one or more non-rotating vibratory generators 1000, such as shown in FIG. 10B, or one or more turbines 710 and one or more non-rotating-vibratory-generator systems 1100, such as shown in FIG. 10B.

Wind-delivery system 1310 may include a duct 125 that may include a converging nozzle 425, as described above in conjunction with FIG. 4. For example, duct 125 may be a substantially vertical (e.g., vertical) converging nozzle that converges in the direction of the wind flow therethrough. For some embodiments, duct 125 may be at least a portion of or may be located in an elevator shaft of building 1300. Duct 125 is fluidly coupled to energy-extraction section 115. An object 1312 may extend into duct 125 and may be configured to deflect wind into duct 125.

Wind-delivery system 1310 may include a space (e.g., a story) 1315 of building 1300 between adjacent floors $1317_i$ and $1317_{i+1}$. For example, story 1315 may be a service story and/or may be dedicated to ventilation and/or air conditioning of building 1300. Story 1315 may contain object 1312. A portion of object 1312 may extend through floor 1317, and into the story below story 1315 as object 1312 extends into duct 125, as shown in FIG. 13B. Note that story 1315 may be several stories above ground level and may be an upper story of building 1300.

Wind may enter story 1315 through windows 1318 of story 1315. For example, windows 1310 may form inlets to wind-delivery system 1310, and thus to wind-energy-conversion system 1305. For some embodiments, an inlet 1320 to duct 125 may be in the floor 1317, of story 1315. As such, duct 125 opens into and is fluidly coupled to story 1315. Duct 125 may extend downward from floor 1317, through one or more floors before reaching energy-extraction section 115. For example, energy-extraction section 115, and thus the energy extractor therein, maybe on a floor of building 1300 that is one or more floors (e.g., stories) of building 1300 below the inlet 1320 to duct 125, and thus story 1315. Duct 125 may fluidly couple story 1315 to energy-extraction section 115, and thus to the energy extractor in energy-extraction section 115.

For some embodiments, a vane 1325 may pass through story 1315 from each of windows 1318 to object 1312. Vanes 1325 may be configured to direct wind through story 1315 from windows 1318 to object 1312, which in turn directs the wind into duct 125 through inlet 1320.

An embodiment of a method of installing a wind-energy-conversion system for a building may include positioning at least a portion of a substantially vertical converging nozzle within the building and connecting the substantially vertical converging nozzle to an energy-extraction assembly so that the substantially vertical converging nozzle is fluidly coupled to the energy-extraction assembly. For some embodiments the method may be performed as part of constructing the building. For other embodiments, the method may performed after the building is constructed, e.g., as part of retrofitting the building.

For one embodiment, positioning at least a portion of the substantially vertical converging nozzle within the building may include passing the substantially vertical converging nozzle through one or more floors of the building. For another embodiment, the energy-extraction assembly may be installed in the building before connecting the substantially vertical converging nozzle to the energy-extraction assembly.

For some embodiments, the method may include connecting a substantially horizontal converging nozzle to the substantially vertical converging nozzle so that the substantially horizontal converging nozzle is fluidly coupled to the substantially vertical converging nozzle. For another embodiment, the method may include physically coupling one or more actuators to an outer surface of the substantially vertical converging nozzle and/or the substantially horizontal converging nozzle and communicatively coupling the actuators to a controller, where the one or more actuators are configured to change a shape of the substantially vertical converging nozzle and/or the substantially horizontal converging nozzle in response to receiving signals from the controller, where the signals are based on a wind speed.

The substantially vertical converging nozzle may include a first substantially vertical converging nozzle. For one embodiment, the method may include connecting a second substantially vertical converging nozzle to the first substantially vertical converging nozzle so that the second substantially vertical converging nozzle is fluidly coupled to the first substantially vertical converging nozzle, and may include positioning a third substantially vertical converging nozzle so that the third substantially vertical converging nozzle extends into the second substantially vertical converging nozzle so that the third substantially vertical converging nozzle is fluidly coupled to the first substantially vertical converging nozzle.

For another embodiment, the method may include installing a plurality of vanes on an interior of at least one of the second substantially vertical converging nozzle and the third substantially vertical converging nozzle. For a further embodiment, the method may include physically coupling one or more actuators to at least one of the first, second, and third substantially vertical converging nozzles and communicatively coupling the one or more actuators to a controller, where the controller is configured to send signals to the one or more actuators based on a wind speed.

Another embodiment of a method of installing a wind-energy-conversion system in a building might include installing a duct in the building so that the duct opens to at least one space within the building, and installing an energy-extraction assembly in the building so that the duct fluidly couples the energy-extraction assembly to the at least one space. For some embodiments, installing the duct in the building may include installing at least a portion of an elevator shaft in the building. For other embodiments, the method may be performed as part of constructing the building or after the building is constructed, e.g., as a retrofit (e.g., as an add-on) to the building.

In another embodiment, the method may include installing an object in the at least one space so that the object extends into the duct. For a further embodiment, the method might include installing one or more vanes in the at least one space that respectively pass through the at least one space from one or more windows of the space to the object.

Another embodiment method of installing a wind-energy-conversion system for a building might include installing a first substantially vertical converging nozzle so that the first substantially vertical converging nozzle opens to an exterior of the building, installing a first energy extractor in the building, installing a first duct in the building that fluidly couples the first substantially vertical converging nozzle to the first energy extractor, installing a second substantially vertical converging nozzle so that the second substantially vertical converging nozzle extends into the first substantially vertical converging nozzle and so that the second substantially vertical converging nozzle opens to the exterior of the building, installing a second energy extractor in the building, installing a second duct in the building that fluidly couples the second substantially vertical converging nozzle to the second energy extractor, and installing an object that extends into the second substantially vertical converging nozzle. For some embodiments, a flow passage in the first duct might not communicate with a flow passage in the second duct. The method might be performed as part of constructing the building or might be performed after the building is constructed, e.g., as a retrofit (e.g., as an add-on) to the building.

For other embodiments, installing the second duct in the building may include installing a portion of the second duct within the first duct and passing an other portion of the second duct through a wall of the first duct and connecting the other portion of the second duct to the second energy extractor.

CONCLUSION

Although specific embodiments have been illustrated and described herein it is manifestly intended that the scope of the claimed subject matter be limited only by the following claims and equivalents thereof.

What is claimed is:
1. A building, comprising: a wind-energy-conversion system, comprising:
   a substantially vertical converging nozzle;
   an energy extractor fluidly coupled to the substantially vertical converging nozzle, the wind-energy-conversion system for converting wind outside the building to energy, the energy extractor comprising one or more turbines and/or one or more non-rotating generators;
   a substantially horizontal converging nozzle fluidly coupled to the substantially vertical converging nozzle so that the substantially vertical converging nozzle is between the substantially horizontal converging nozzle and the energy extractor, wherein the substantially horizontal converging nozzle is configured to rotate relative to the substantially vertical converging nozzle; and
   one or more actuators coupled to an outer surface of the substantially vertical converging nozzle and/or the substantially horizontal converging nozzle, wherein the one or more actuators are configured to change a shape of the substantially vertical converging nozzle and/or the substantially horizontal converging nozzle in response to receiving signals from a controller, wherein the signals are based on a wind speed.

2. The building of claim 1, wherein the substantially vertical converging nozzle and the substantially horizontal converging nozzle are external to the building.

3. The building of claim 1, wherein the substantially vertical converging nozzle passes through one or more floors of the building.

4. A building, comprising: a wind-energy-conversion system, comprising:
   a first substantially vertical converging nozzle;
   a second substantially vertical converging nozzle that extends into the first substantially vertical converging nozzle;
   an energy extractor fluidly coupled to the first substantially vertical converging nozzle, the wind-energy-conversion system for converting wind outside the building to energy, the energy extractor comprising one or more turbines and/or one or more non-rotating generators;
   one or more actuators coupled to at least one of the first substantially vertical converging nozzle and the second substantially vertical converging nozzle; and
   a controller coupled to the one or more actuators coupled to the at least one of the first substantially vertical converging nozzle and the second substantially vertical converging nozzle; wherein the controller is configured to send signals to the one or more actuators coupled to the at least one of the first substantially vertical converging nozzle and the second substantially vertical converging nozzle based on a wind speed.

5. A building, comprising: a wind-energy-conversion system, comprising:
   a first substantially vertical converging nozzle;
   a second substantially vertical converging nozzle fluidly coupled to the first substantially vertical converging nozzle;
   a third substantially vertical converging nozzle fluidly coupled to the first substantially vertical converging nozzle and extending into the second substantially vertical converging nozzle;
   an energy extractor fluidly coupled to the first substantially vertical converging nozzle, the wind-energy-conversion system for converting wind outside the building to energy, the energy extractor comprising one or more turbines and/or one or more non-rotating generators;
   one or more actuators coupled to at least one of the first, second, and third substantially vertical converging nozzles; and
   a controller coupled to the one or more actuators coupled to the at least one of the first, second, and third substantially vertical converging nozzles; wherein the controller is configured to send signals to the one or more actuators coupled to the at least one of the first, second, and third substantially vertical converging nozzles based on a wind speed.

6. A building, comprising: a wind-energy-conversion system, comprising:
   a substantially vertical converging nozzle;
   an energy extractor fluidly coupled to the substantially vertical converging nozzle, the wind-energy-conversion system for converting wind outside the building to energy, the energy extractor comprising one or more turbines and/or one or more non-rotating generators; wherein each of the one or more non-rotating generators is a vibratory non-rotating generator comprising an electrical-charge-producing material; and a controller configured to cause at least one of a stiffness of a boundary constraint coupled to each of the one or more non-rotating vibratory generators, a distribution of an active mass on each of the one or more non-rotating vibratory generators, and a tension exerted by a tension adjuster on each of the one or more non-rotating vibratory generators to be adjusted based on a power generated by the one or more non-rotating vibratory generators and/or a flow rate of wind flowing in the wind-energy-conversion system.

7. The building of claim 6, wherein the substantially vertical converging nozzle is a first substantially vertical converging nozzle, and wherein the wind-energy-conversion system further comprises a second substantially vertical converging nozzle fluidly coupled to the first substantially vertical converging nozzle and a third substantially vertical converging nozzle fluidly coupled to the first substantially vertical converging nozzle and extending into the second substantially vertical converging nozzle.

8. The building of claim 7, wherein the wind-energy-conversion system further comprises a plurality of vanes extending into an interior of at least one of the second substantially vertical converging nozzle and the third substantially vertical converging nozzle.

9. The building of claim 7, wherein the first, second, and third substantially vertical converging nozzles are external to the building.

10. The building of claim 6, wherein the wind-energy-conversion system further comprises an object that extends into the substantially vertical converging nozzle and that is configured to deflect wind into the substantially vertical converging nozzle.

11. The building of claim 6, wherein the substantially vertical converging nozzle is a first substantially vertical converging nozzle, and wherein the wind-energy-conversion system further comprises a second substantially vertical converging nozzle, wherein the first substantially vertical converging nozzle extends into the second substantially vertical converging nozzle.

12. The building of claim 6, wherein the substantially vertical converging nozzle is a first substantially vertical converging nozzle, and wherein the wind-energy-conversion system further comprises a second substantially vertical converging nozzle that extends into the first substantially vertical converging nozzle.

13. The building of claim 12, wherein the wind-energy-conversion system further comprises a plurality of vanes extending into an interior of at least one of the first substantially vertical converging nozzle and the second substantially vertical converging nozzle.

* * * * *